United States Patent [19]

Broding

[11] Patent Number: 4,597,183

[45] Date of Patent: Jul. 1, 1986

[54] METHODS AND APPARATUS FOR MEASURING A LENGTH OF CABLE SUSPENDING A WELL LOGGING TOOL IN A BOREHOLE

[75] Inventor: Robert A. Broding, Tulsa, Okla.

[73] Assignee: Standard Oil Company (Indiana), Chicago, Ill.

[21] Appl. No.: 469,592

[22] Filed: Feb. 24, 1983

[51] Int. Cl.$^4$ .......................... G01B 7/26; G01B 7/04
[52] U.S. Cl. .................................. 33/125 W; 33/127; 324/206; 324/263
[58] Field of Search ................ 324/206, 207, 208, 52, 324/66, 337, 260-263; 179/175.3 F; 33/127, 125 W; 73/597; 364/562; 356/5

[56] References Cited

U.S. PATENT DOCUMENTS

| | | | |
|---|---|---|---|
| 2,651,752 | 9/1953 | Devot | 324/52 |
| 3,462,681 | 8/1969 | Biskup | 324/52 |
| 3,470,460 | 9/1969 | Panofsky et al. | 324/226 X |
| 3,609,533 | 9/1971 | Pardis | 324/52 |
| 3,781,665 | 12/1973 | Gale | 324/52 |
| 4,028,619 | 6/1977 | Edwards | 324/208 |
| 4,041,381 | 8/1977 | Hwa | 179/175.3 F X |
| 4,104,582 | 8/1978 | Lambertsen | 324/52 |
| 4,241,430 | 12/1980 | Kayem et al. | 73/597 X |
| 4,247,768 | 1/1981 | Elmer et al. | 364/562 X |
| 4,297,030 | 10/1981 | Chaborski | 356/5 |
| 4,299,484 | 11/1981 | Holzapfel | 356/5 |
| 4,319,189 | 3/1982 | Cullum, Jr. et al. | 324/208 |
| 4,342,514 | 8/1982 | Mathews | 356/5 |
| 4,404,514 | 9/1983 | Reichert, Jr. | 324/52 |
| 4,427,940 | 1/1984 | Hirama et al. | 324/206 |
| 4,434,971 | 3/1984 | Cordrey | 364/562 X |
| 4,510,587 | 8/1985 | Schneider | 324/208 X |

FOREIGN PATENT DOCUMENTS

| | | | |
|---|---|---|---|
| 3018300 | 11/1981 | Fed. Rep. of Germany | 179/175.3 F |
| 0008009 | 1/1978 | Japan | 179/175.3 F |

OTHER PUBLICATIONS

"Measurement of Mine Roof Movement", U.S. Dept. of the Interior/Bureau of Mines, Jul. 1978, pp. 34-35.
Lebert, "Pulse Testing of Coaxial Cables", Bell Laboratories Record, Apr., 1951, pp. 153-157.
Deltenre et al, "Underground Cable Fault Location: A Handbook to TD-153", Electric Power Research Inst., Jan., 1977, pp. 11-1-11-18.

Primary Examiner—Gerard R. Strecker
Assistant Examiner—Warren S. Edmonds
Attorney, Agent, or Firm—Timothy D. Stanley

[57] ABSTRACT

Methods and apparatus are disclosed for measuring a length of logging cable introduced into a borehole, thereby measuring the depth of a logging tool, or sonde, attached to the lower end of the cable. The methods involve producing an electrical signal, which propagates along the cable, and detecting at the mouth of the borehole the time of passage of the initial electrical signal and the time of passage of a subsequent electrical signal reflected or returned upwardly from the lower end of the cable, or, alternatively, the time of arrival of the reflected or returned electrical signal at the upper end of the cable. These times can be determined by means of clocks which are switched on by the passage of the initial electrical signal and switched off by the subsequent electrical signal. Knowing the time intervals and the velocity of propagation of electrical signals in the cable, the length of cable from the mouth of the borehole to the lower end of the cable, and thus the depth of the sonde, is measured. Various embodiments of apparatus including electrical signal detectors which do not electrically contact the cable are disclosed for sensing the electrical signals necessary for measuring the length of cable introduced into the borehole, and thus the depth of the sonde.

25 Claims, 5 Drawing Figures

METHODS AND APPARATUS FOR MEASURING A LENGTH OF CABLE SUSPENDING A WELL LOGGING TOOL IN A BOREHOLE

BACKGROUND OF THE INVENTION

This invention relates to measuring the length of a run of cable, for example, the measurement of a length of cable from a selected point intermediate the two ends of the cable to a distant point, such as one end of the cable. Specifically, this invention is directed to the field of logging in boreholes, such as oil and gas wells, by means of a logging tool, or sonde, lowered on an armored multi-conductor cable which is longer than the depth of the borehole, where the length of cable introduced into the borehole is measured in order to ascertain the depth of the sonde.

Techniques for electrically measuring the total length, or the length of cable between one end and a break, or short, in a long conductor, such as a telephone cable and the like, are known. One technique for electrically measuring the length of cable from one end of a cable to the other, or from one end of a cable to a point where a conductor is broken, or where a conductor is shorted, is to make electrical contact with and apply a very short time duration electrical signal to one end of the conductor in question and monitor the time during which the electrical signal travels along the conductor to the other end, or to the break, or to the short, and is reflected on the conductor back to the end of the conductor to which the electrical signal was applied. The distance can then be computed based on the velocity of propagation of the electrical signal in the conductor. Such a technique, for example, is employed in time domain reflectometer cable testers, such as sold by Tektronix, Inc., of Beaverton, Oreg., under the designations Models 1502 and 1503.

The problem addressed by this invention is somewhat different. The problem is not to measure the total length of a cable, or the length of cable between one end and a break, or a short, in that cable, but rather to measure only a portion of the length of a cable, that is, between a selected first point, intermediate the two ends, and a second point, at a distant end, for example, under circumstances where it is neither desirable nor practical to make electrical contact with the cable at either the first or the second point. This invention provides the advantage of measuring a length of cable between the first and second points without electrically contacting the cable at either point.

Additionally, the known technique for measuring a length of cable between the mouth of a borehole and a sonde, and thus the depth of the sonde, is by means of a measuring wheel which is positioned at the mouth of the borehole. The cable is trained over the wheel so that the wheel rotates as the cable is introduced into the borehole. The wheel is precisely constructed, and the circumference of the wheel is very accurately known. The length of cable which has been introduced into the borehole can be measured as the cable enters the borehole based on a count of the rotations, or partial rotations, of the wheel so that the depth of the sonde is known.

However, because of friction in the wheel, slippage of the cable over the wheel, or faulty contacts in the slip rings of the counter circuit which is operated by the rotations of the wheel, there can be an error involved in the measurement of the length of cable introduced into the borehole, and thus an error in the measurement of the depth of the sonde. When an error occurs, the normal procedure is to raise the sonde back to the surface, reset the counter to zero, and reinitiate borehole logging by lowering the sonde into the borehole while again monitoring the operation of the counter. The loss of time and the expense of having to repeat the logging process is highly undesirable.

SUMMARY OF THE INVENTION

The invention provides a method and apparatus for measuring a length of electrically conductive cable which comprises applying an electrical signal to the cable at a location where the cable can be electrically contacted; initiating the measuring of a time interval commencing no sooner than the time that the electrical signal is applied to the cable; and concluding the measuring of the time interval no sooner than the time that the electrical signal is detected at a selected point without electrically contacting the cable, the time interval being correlated to the length of cable. The time interval is correlated to the length of cable in that the time interval times the velocity of propagation of the electrical signal in the cable yields a measurement of the distance traveled by the electrical signal. The present invention provides, for example, a method and apparatus for measuring a length of cable between a first point at a selected position along the cable intermediate the two ends and a second point, at a distant end, for example, where it is undesirable to make electrical contact with the cable at either the first or the second point.

One embodiment of the method of the invention comprises applying an electrical signal to the cable at a point where the cable can be electrically contacted, such as one end of the cable, whereby the electrical signal propagates the length of the cable; detecting at the first point along the cable an initial passage of the electrical signal in the cable without electrically contacting the cable, the first point being intermediate the point where the electrical signal is applied and the second point along the cable where the electrical signal is reflected; detecting the electrical signal after the electrical signal is reflected at the second point; and determining the time interval between the initial passage of the electrical signal and the detection of the reflected electrical signal, the time interval being correlated to the length of cable between the first and second points. The time interval is correlated to the length of cable in that the time interval times the velocity of propagation of the electrical signal in the cable yields a measurement of the distance traveled by the electrical signal from the first point to the second point and, after reflection, back to the point of detection of the reflected electrical signal. Preferably, a subsequent passage of the reflected electrical signal is detected at the first point without electrically contacting the cable, and the length of cable between the first and second points is determined by dividing the time interval by two and multiplying times the known velocity of propagation of the electrical signal in the cable.

In accordance with another embodiment of the method of the invention, a modification is made that the arrival of the electrical signal is detected at the second point, and, in response, another electrical signal is returned, rather than having the arriving electrical signal reflected. Preferably, a subsequent passage of the returned electrical signal is detected at the first point without electrically contacting the cable, and the length of cable between the first and second points is determined by dividing the time interval by two and multiplying times the known velocity of propagation of the electrical signal in the cable.

In accordance with one embodiment of the apparatus in the invention, a clock is started at the time that the initial passage of the electrical signal is detected at the first point along the cable, as the electrical signal propagates toward the second point along the cable; and the clock is stopped at the time that the subsequent passage of the reflected electrical signal, or, alternatively, the electrical signal returned by a transponder means, is detected, as the reflected, or returned, electrical signal propagates back toward the first point from the second point. The total time is twice the time of travel of an electrical signal from the first point of the second point. Knowing the velocity of propagation of the electrical signal in the cable, the length of cable between the first and second points can be determined by dividing the total time by two and multiplying by the velocity of propagation.

In accordance with the method and apparatus of the invention, the electrical signal in the cable is detected without electrically contacting the cable, preferably by sensing the magnetic field around the cable. That is, the passage of the electrical signal can be magnetically detected without making electrical contact with the cable.

This invention is particularly applicable in borehole logging. The cable is initially reeled onto a large power driven drum. The cable is generally a multi-conductor cable with a wrapped sheath of steel wire for providing tensile strength. The only point along the cable where electrical contact can be conveniently made with a conductor is at the upper end of the cable, that is, at the power driven drum. The cable is reeled off the drum past a first point at the mouth of the borehole and introduced into the borehole, with the sonde attached at a second point at the lower end of the cable. The measurement desired is the depth of the sonde below the first point, at the mouth of the borehole, to the second point, where the sonde is attached to the cable.

BRIEF DESCRIPTION OF THE DRAWINGS

The above and other features and advantages of this invention and a better understanding of the principles and details of the invention will be evident from the following description taken in conjunction with the accompanying drawings. In the drawings.

DESCRIPTION OF THE PREFERRED EMBODIMENTS

Figure 1:
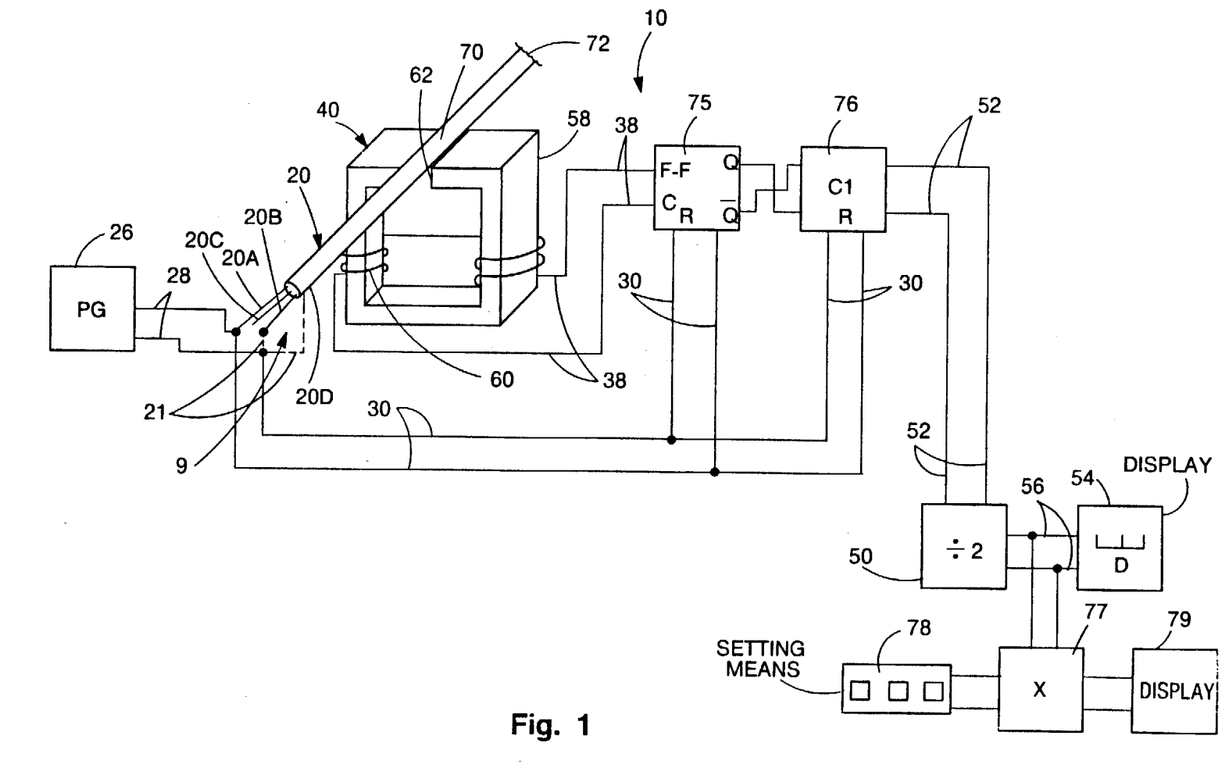
FIG. 1 shows schematically one embodiment of the invention including a detail of a preferred electrical signal detector means in position adjacent a cable for providing an electrical response coincident with the passage of an electrical signal.

Referring now to the drawings and in particular to FIG. 1, there is shown schematically an armored multi-conductor cable 20 and one embodiment in accordance with the invention, indicated generally by the numeral 10, for measuring the length of a run of cable between a first point 70, intermediate the two ends of the cable, and a second point 72, at one end of the cable, for example, where it is not desirable or practical to make electrical contact with the cable at either the first or the second point. The cable 20 is susceptible to electrical contact at some other point, at the other end of the cable, for example, indicated generally by the numeral 9.

Figure 3:
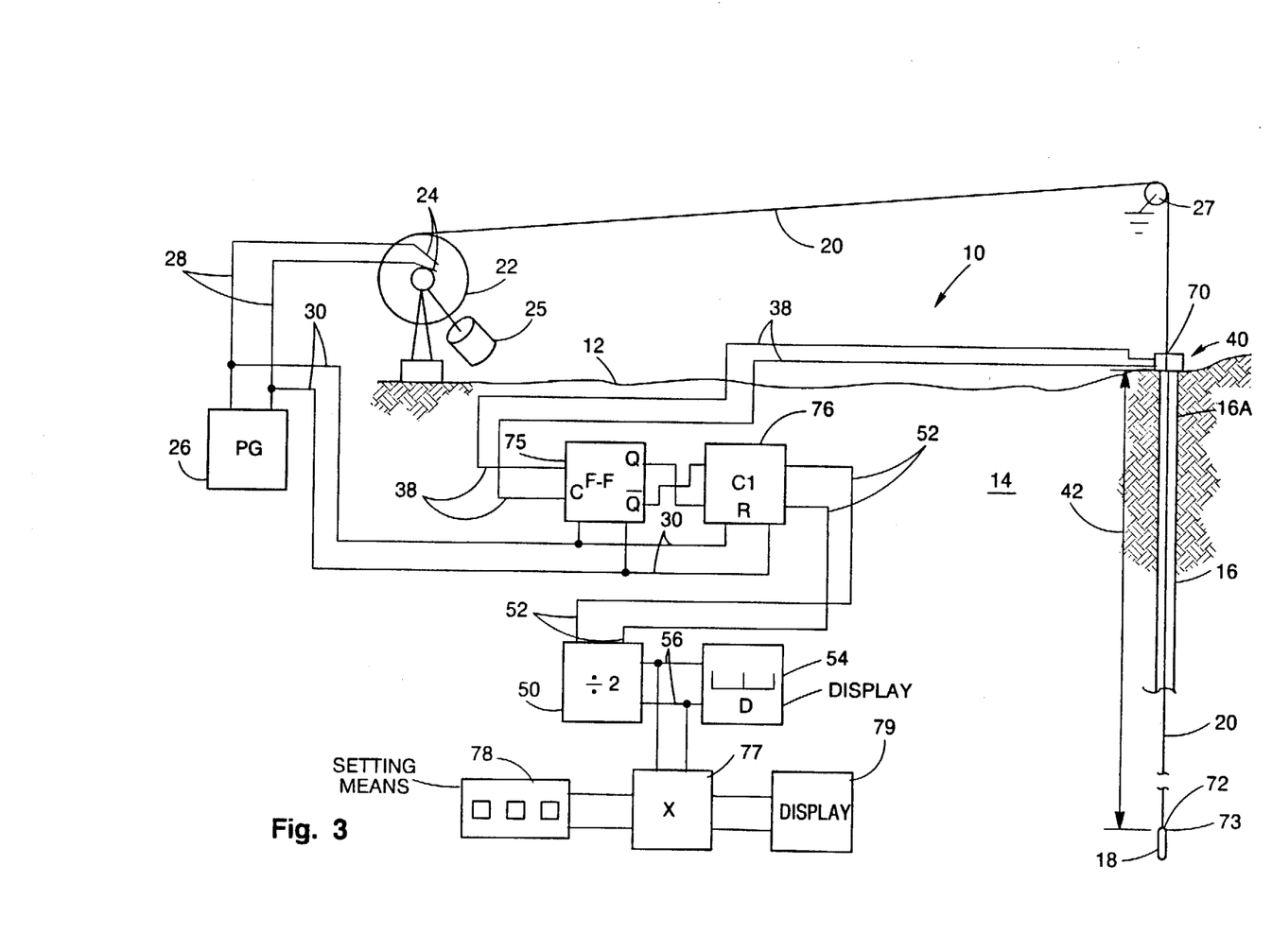
FIG. 3 shows an embodiment of the invention applied to borehole logging.

By way of example, in FIG. 3 is shown an elevational view of a borehole 16 in the earth 14. The surface of the earth 14 is indicated by the numeral 12, and the borehole 16 in the earth may be totally or partially encased as indicated at 16A. An armored multi-conductor logging cable 20 is shown being unreeled from a power driven drum 22, the cable being trained over a pulley 27 and guided into the borehole 16. A sonde 18 is attached to the cable 20 and introduced into the borehole 16.

The first point 70 is coincident with the mouth of the borehole 16 at the surface 12 of the earth 14. The second point 72 is coincident with the lower end of the cable 20, where the sonde 18 is attached. There is a distance 42 between the first point 70 at the mouth of the borehole 16 and the second point 72 at the sonde 18, which represents the length of cable at that moment in the borehole, and thus the depth of the sonde below the surface 12 of the earth 14. It is generally desired to know the distance 42, or the length of cable between the first point 70 and the second point 72, which corresponds to the depth of the sonde 18.

The cable 20 is reeled on the drum 22 which is powered by a motor or engine 25. The conductors of the cable 20, as well as the sheath of the cable, are preferably connected to slip rings, of which two are shown, indicated by the numeral 24. As shown in FIG. 3, the slip rings 24 are connected to leads 28 which correspond to leads 28 shown in FIG. 1.

Leads 28 are connected to an electrical signal generator 26. The signal generator 26 is preferably an off-the-shelf device which can provide selected voltages and selected time duration from selected small time intervals of a few nanoseconds, to microseconds, or milliseconds. The signal generator 26 is capable of applying an electrical signal to the upper end of the cable 20, through the slip rings 24 in FIG. 3, for example, so that the electrical signal propagates the full length of the cable, part of which can be reeled on the drum 22 and most of the remainder of which can be disposed in the borehole 16 as shown in FIG. 3.

Referring again to FIG. 1, the cable 20 includes interior conductors 20A, 20B, 20C, etc., and a sheath 20D. The leads 28 from the signal generator 26 can be connected alternatively, as indicated by the dashed line 21, to two conductors 20A and 20B of the cable 20, for example, or between the conductor 20A, for example, and the sheath 20D of the cable. In one embodiment, one of the leads 28 is connected to one of the conductors 20A, 20B, 20C, etc., of the cable 20, and the other of the leads is connected to another of the conductors of the cable. In another embodiment, one of the leads 28 is connected to one of the conductors 20A, 20B, 20C, etc., of the cable 20, and the other of the leads is connected to the sheath 20D of the cable. The particular connections of the leads 28 to the cable 20 depend upon factors which will be described later.

A signal detector means, indicated generally by the numeral 40, is used for sensing the passage of an electrical signal in the cable 20 as the electrical signal passes the first point 70 where the signal detector means is positioned. As shown in FIG. 1, the signal detector means 40 is preferably a magnetic device which comprises a U-shaped core 58 of a selected magnetic material, such as a ferrite material, which has high magnetic susceptibility. The U-shaped core 58 is mounted such that the cable 20 passes between the two faces 62 of the gap between the arms of the core, so that any magnetic field generated by the passage of the electrical signal induces a magnetic flux in the core. There is a coil 60 which surrounds the arms 62 of the U-shaped core 58, and the coil is connected to leads 38.

Figure 2:
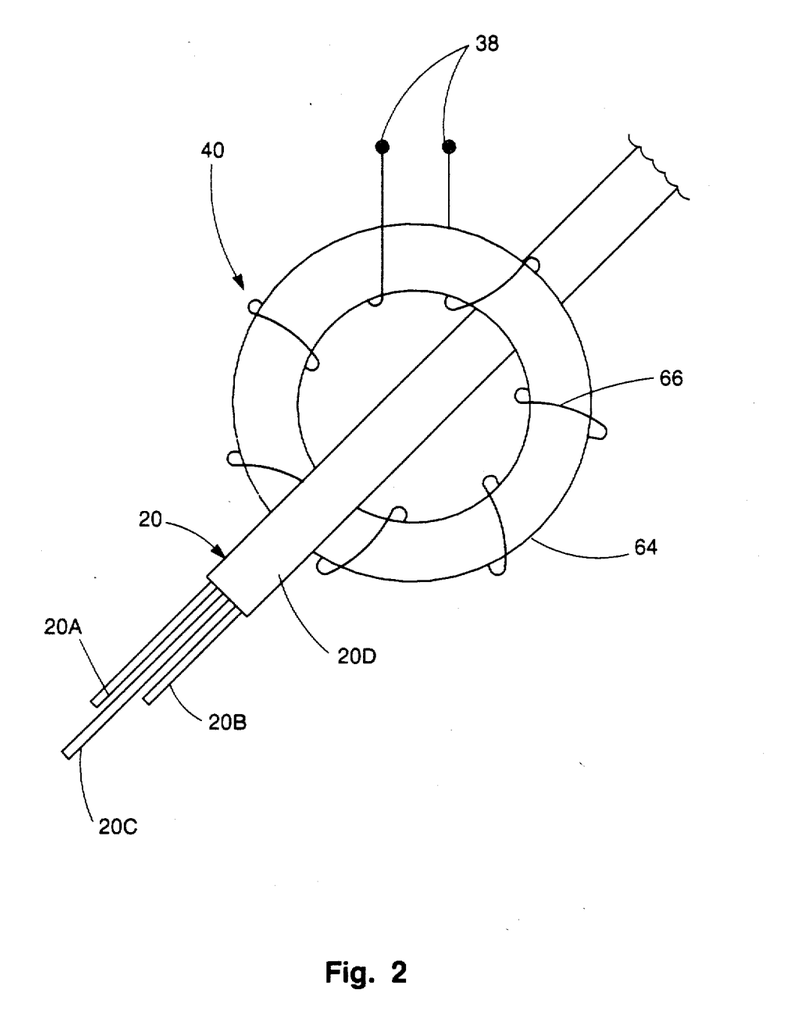
FIG. 2 shows an alternative embodiment of electrical signal detector means.

FIG. 2 shows an alternative embodiment of the signal detector means 40 which is in the form of a toroidal core 64 of a selected magnetic material, such as a ferrite material. A coil 66 is wound around the toroidal core 64, and the coil is connected to leads 38 which correspond to the leads 38 shown in FIG. 1. There are, of course, other examples of magnetic structures for generating an electrical response upon the passage of an electrical signal in the cable 20 contemplated within the scope of the invention.

If the electrical signal produced by the signal generator 26 propagates downwardly along the cable 20 while the signal detector means 40 is in the position shown in FIG. 3, an electrical response is generated in the coil 60 or 66 positioned at the first point 70 at the mouth of the borehole 16. The electrical response appears on the leads 38. Furthermore, as the electrical signal propagates downwardly along the cable 20 and reaches the second point 72, in accordance with the invention, the electrical signal is reflected, or, alternatively, another electrical signal is returned by a transponder means, indicated by the numeral 73, upwardly and propagates along the cable to the signal detector means 40, and there is another electrical response generated in the coil 60 or 66, which appears on the leads 38.

In the most straightforward implementation, the electrical signal produced by the signal generator 26 propagates along the cable 20 and is reflected at the second point 72. In order for reflection to occur at the second point 72, the conductive circuit in the cable 20 to which the electrical signal produced by the signal generator 26 is applied must be substantially either short-circuited or open-circuited at the second point 72. In some borehole logging applications, there is a sufficient number of conductors, such as 20A, 20B, 20C, etc., of the cable 20 that the lower ends of two such conductors, say the conductors 20A and 20B as indicated in FIG. 1, can be short-circuited at the attachment of the sonde 18 to the cable. Consequently, the electrical signal produced by the signal generator 26 is reflected at the second point 72.

In other borehole logging applications, electrical power must be supplied to the sonde 18 through the cable 20. In such a case, two conductors, such as 20A and 20B of the cable 20, can have their ends twisted together in order to provide a sufficient hot lead for power to be supplied to the sonde 18 with the return for the power circuit through another conductor, such as the conductor 20C, or the sheath 20D of the cable.

Since the ends of the conductors 20A and 20B of the cable 20 are twisted together at the second point 72, they are short-circuited. In such a situation, if the conductors 20A and 20B of the cable 20 are disconnected at their upper ends from the power source (not shown) for the sonde 18 and instead connected to the signal generator 26, the electrical signal produced by the signal generator is reflected at the second point 72.

Unfortunately, in some other borehole logging applications, there can be an insufficient number of conductors, such as 20A, 20B, 20C, etc., of the cable 20 available for providing a short-circuit due to the fact that all such conductors are needed for supplying power and/or transferring control signals to the anode 18 or logging data to the surface 12 of the earth 14. However, in such a situation, one of the conductors 20A, 20B, 20C, etc., of the cable 20 can be disconnected at its upper end from whatever it is connected to and instead connected to the signal generator 26 with the sheath 20D also being connected to the signal generator. If the selected conductor and the sheath 20D of the cable 20 are substantially short-circuited or open-circuited at the second point 72, reflection of the electrical signal produced by the signal generator 26 occurs at the second point.

There is somewhat of a limitation on the precision of the reflection method for long lengths of cable. The best measurements of the length of cable introduced into the borehole 16, and thus the depth of the sonde 18, are made when the electrical signal has a sharp rate of rise (sharp leading edge). However, as the electrical signal propagates along the cable 20, the shape of the electrical signal produced by the signal generator 26 tends to become rounded; and after a long distance of propagation, the electrical signal can be attenuated and distorted by electrical effects in the cable and in the insulation and capacitance surrounding the cable.

In the case of a very long cable length on the order of approximately 10,000 feet or more, a slight modification is desirable. Instead of a short- or open-circuited termination at the second point 72 for causing a reflection, the transponder means 73, such as a one-shot or other monostable circuit, is connected to the conductive circuit of the cable 20 to which the electrical signal produced by the signal generator 26 is applied as shown in FIG. 3. The transponder means 73 is triggered by the electrical signal produced by the signal generator 26 and returns another electrical signal upwardly toward the signal detector means 40. Any time delay inherent in the operation of the transponder means 73 can be obtained from the specifications published by the manufacturer of the transponder device or measured by calibrating over known cable lengths and can be subtracted from the time interval between the detection of the electrical signal produced by the signal generator 26 and the detection of the electrical signal returned by the transponder means.

Now, as shown in FIG. 1, leads 30 from the signal generator 26 are preferably connected to the reset terminal of a flip-flop 75 and also to the reset terminal of a clock C1, indicated by the numeral 76. The clock 76 includes a high frequency oscillator which generates pulses, the time spacing or period of which is precisely known. An electrical counter is also included in the clock 76 for counting the number of clock pulses between the detection of the passage of the electrical signal downwardly along the cable 20 past the first point 70 and also the detection of the passage of the reflected or returned electrical signal upwardly along the cable so that the travel time of the electrical signal from the first point to the second point 72 and the reflected or returned electrical signal from the second point to the first point is precisely known as a certain number of nanoseconds, for example.

Considered in more detail, the Q output of the flip-flop 75 is connected to the disable terminal of the clock 76. When the electrical signal produced by the signal generator 26 is applied to the cable 20, the flip-flop 75 is reset. Consequently, the Q output of the flip-flop 75 transposes to a voltage level such that the clock 76 is disabled.

The leads 38 from the signal detector means 40 are connected to the clock input of the flip-flop 75. Consequently, the flip-flop 75 is clocked when the downwardly propagating electrical signal is sensed at the first point 70 by the signal detector means 40. The electrical response generated by the signal detector means 40 can be amplified and shaped in order to assure precise operation, but this is well known in the art and need not be described further.

The $\overline{Q}$ output of the flip-flop 75 is connected to the enable input of the clock 76. When the flip-flop 75 is clocked by the electrical response generated by the signal detector means 40 in response to the detection of the downwardly propagating electrical signal, the $\overline{Q}$ output of the flip-flop transposes to a voltage level which enables the clock 76. Consequently, the clock 76 is started at the time T1 shown in FIG. 5.

When the upwardly propagating reflected electrical signal, or, alternatively, the electrical signal returned upwardly by the transponder means 73, is sensed at the first point 70 by the signal detector means 40, the flip-flop 75 is again clocked. When the flip-flop 75 is clocked by the electrical response generated by the signal detector means 40 in response to the detection of the upwardly propagating electrical signal, the Q output of the flip-flop transposes to a voltage level which disables the clock 76. Consequently, the clock 76 is stopped at the time T2 shown in FIG. 5. Thus, the time interval T2 minus T1 is registered by the clock 76.

The rate of travel of an electrical signal in conductors of various types of cable has been studied, and the velocity of propagation is available in the literature. Alternatively, the velocity of propagation of an electrical signal in a cable can be calibrated by measuring the length of the cable accurately, say stretched out on the ground, and then determining the time of travel of the electrical signal from one end to the other and dividing the length by the travel time.

Knowing the velocity of propagation and the time of travel of the electrical signal from the first point 70 to the second point 72 and the reflected or returned electrical signal from the second point to the first point, for example, it is possible then to determine the distance of travel, which is the product of the velocity of propagation in the cable and the time of travel. This value of length then represents twice the length of cable from the first point 70 to the second point 72.

Accordingly, the output of the clock 76 can be connected by leads 52 to a divide-by-two circuit 50. The output of the divide-by-two circuit 50 on leads 56, which connect to a display means, indicated by the numeral 54, such as an oscilloscope, represents one-half of the time interval T2 minus T1, that is, the time interval 74, which is a measure of the time of travel from the first point 70 to the second point 72. This number of nanoseconds, for example, with the known velocity of propagation of the electrical signal in the cable 20 provides the desired answer of the length of cable between the first point 70 and the second point 72, and thus the depth of the sonde 18.

As shown in FIG. 1, the output of the divide-by-two circuit 50 is preferably connected to one input of a multiplier circuit 77. The other input of the multiplier circuit 77 is connected to a velocity of propagation setting means, indicated by the numeral 78, such as a bank of thumbwheel switches or digital pushbutton switches, into which is set the velocity of propagation of the electrical signal in the cable 20. The output of the multiplier circuit 77 is preferably connected to a display means, indicated by the numeral 79, such as a light-emitting diode display, which directly displays the length of cable between the first point 70 and the second point 72, and thus the depth of the sonde 18.

Especially in the case where the reflection method is used, the detection of the downwardly propagating electrical signal by the signal detector means 40 can be more reliable than the detection of the upwardly propagating reflected electrical signal, since the electrical signal can have traveled a great length of cable by the time that the electrical signal is reflected and again reaches the signal detector means. However, since the upper end of the cable 20 is available, such as at the slip rings 24, the reflected electrical signal can be detected more reliably by means of electrical contact than by means of sensing the magnetic field surrounding the sheath 20D of the cable.

Figure 5:
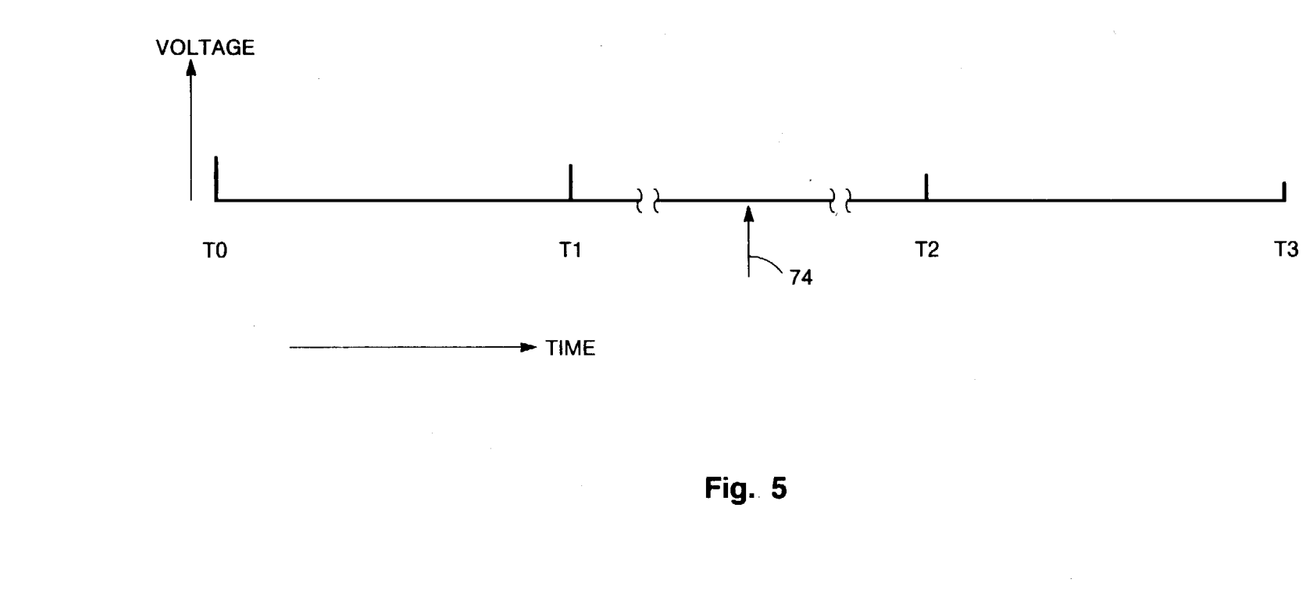
FIG. 5 illustrates a time record of the electrical responses which result from the application of an electrical signal to one end of the cable.

First of all, refer to FIG. 5 for consideration of the electrical responses which appear on the leads 38 from the signal detector means 40. At the time T0, the electrical signal produced by the signal generator 26 is applied to the cable 20. At the time T1, the electrical signal has propagated along the cable 20 to the first point 70. Because the distance to the first point 70 can be a relatively short distance compared to the distance between the first point and the second point 72 and back to the first point, the electrical signal can be reliably sensed by the signal detector means 40 at the time T1 so that the time interval T1 minus T0 can be determined very reliably. The electrical signal then propagates downwardly from the first point 70 to the second point 72. At the second point 72, the electrical signal is reflected and propagates upwardly toward the first point 70. At the time T2, the upwardly propagating reflected electrical signal reaches the first point 70. There may be a long time interval between the time T1 and the time T2, which is the time interval of interest since that interval involves propagation of the electrical signal from the first point 70 to the second point 72 and back. There is then another time interval T3 minus T2, which represents the propagation of the reflected electrical signal from the first point 70 along the cable 20 back to the slip rings 24.

The time interval T3 minus T0 can be made more reliably through electrical contact at the slip rings 24, for example, because the measurement does not depend upon the detection of any leakage flux through the sheath 20D of the cable 20. However, the time interval T1 minus T0, which is dependent upon the detection of leakage flux, is reliable because the electrical signal is relatively large.

Figure 4:
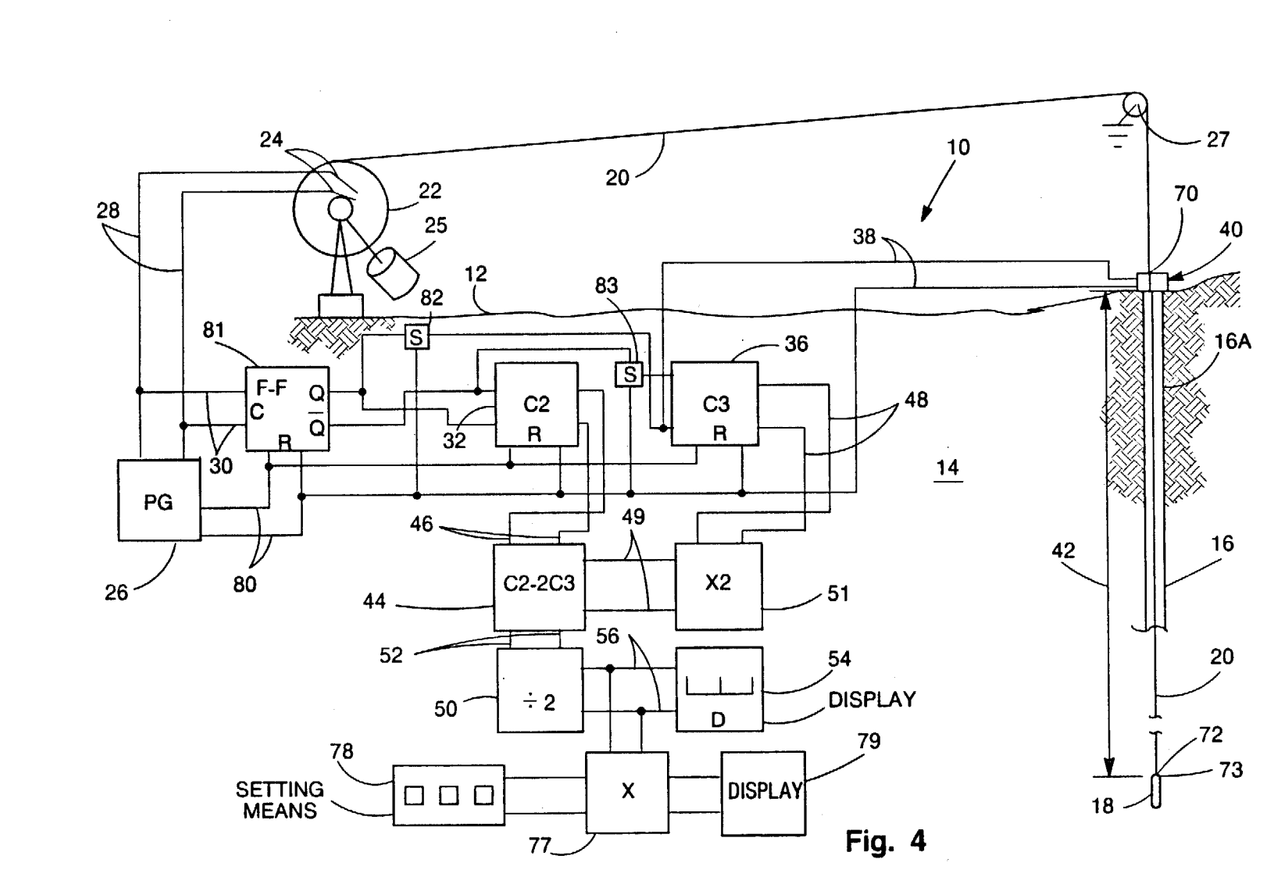
FIG. 4 shows another embodiment of the invention.

Accordingly, there is indicated in FIG. 4 another embodiment of the invention. Leads 80 from the signal generator 26, such as from circuitry within the power circuit of the signal generator which is energized when the signal generator is activated, are preferably connected to the reset terminal of a flip-flop 81 and also to the reset terminal of a clock C2, indicated by the numeral 32, and to the reset terminal of a clock C3, indicated by the numeral 36. The clock 32 is started at the time T0, the time of application of the electrical signal produced by the signal generator 26 to the upper end of the cable 20 at the slip rings 24. The clock 32 is stopped by the reflected electrical signal propagating back through the entire length of the cable 20 when the reflected electrical signal reaches the slip rings 24 at the time T3. The clock 32 measures the time interval T3 minus T0.

The clock 36 is started at the time T0 upon the application of the electrical signal to the upper end of the cable 20 at the slip rings 24 and is stopped by the electrical response generated by the signal detector means 40 as the downwardly propagating electrical signal passes the first point 70. While the clock 32 provides a measurement of the time interval T3 minus T0, the clock 36 provides a measurement of the time interval T1 minus T0.

Considered in more detail, the Q output of the flip-flop 81 is connected to the disable terminal of the clock 32 and through a Schmitt trigger 82 to the disable terminal of the clock 36. When the signal generator 26 is activated, the flip-flop 81 is reset. Consequently, the Q output of the flip-flop 81 transposes to a voltage level such that the clocks 32 and 36 are disabled.

The leads 30 from the signal generator 26 are connected to the clock input of the flip-flop 81. Consequently, the flip-flop 81 is clocked when the electrical signal produced by the signal generator 26 is applied to the cable 20.

The $\bar{Q}$ output of the flip-flop 81 is connected to the enable input of the clock 32 and through a Schmitt trigger 83 to the enable input of the clock 36. When the flip-flop 81 is clocked by the electrical signal produced by the signal generator 26, the $\bar{Q}$ output of the flip-flop transposes to a voltage level which enables the clocks 32 and 36. Consequently, the clocks 32 and 36 are started at the time T0 shown in FIG. 5.

The leads 38 from the signal detector means 40 are connected to the disable input of the clock 36. Consequently, the clock 36 is disabled when the downwardly propagating electrical signal is sensed at the first point 70 by the signal detector means 40. Consequently, the clock 36 is stopped at the time T1 shown in FIG. 5. Thus, the time interval T1 minus T0 is registered by the clock 36.

When the upwardly propagating reflected electrical signal reaches the slip rings 24, the flip-flop 81 is again clocked. When the flip-flop 81 is clocked by the upwardly propagating electrical signal, the Q output of the flip-flop transposes to a voltage level which disables the clock 32. Consequently, the clock 32 is stopped at the time T3 shown in FIG. 5. Thus, the time interval T3 minus T0 is registered by the clock 32.

The output of the clock 36 is connected by leads 48 to the input of a multiplier circuit 51. The time interval registered by the clock 36 is multiplied times two by the multiplier circuit 51, and the product corresponds to the sum of the time interval T1 minus T0 plus the time interval T3 minus T2 (T1 minus T0 equals T3 minus T2). A subtractor 44 receives over leads 46 the time interval T3 minus T0 from the output of the clock 32 and receives over leads 49 twice the time interval T1 minus T0 (which equals T1 minus T0 plus T3 minus T2) from the output of the multiplier circuit 51. The subtractor 44 subtracts twice the time interval T1 minus T0 from the time interval T3 minus T0 to provide the time interval T2 minus T1. The time interval T2 minus T1 appears on the leads 52 which connect the output of the subtractor 44 to the input of the divide-by-two circuit 50.

The output of the divide-by-two circuit 50 is preferably connected to one input of the multiplier circuit 77, the other input of the multiplier circuit being connected to the velocity of propagation setting means 78. The output of the multiplier circuit 77 is preferably connected to the display means 79 which directly displays the length of cable between the first point 70 and the second point 72, and thus the depth of the sonde 18.

The embodiment in which the upwardly propagating electrical signal is detected at the slip rings 24 is primarily for instances where the reflection method is used. However, the upwardly propagating electrical signal returned by the transponder means 73 can also be similarly detected at the slip rings 24.

The form of the electrical signal produced by the signal generator 26 can be a short time duration pulse having a sharp rate of rise, for example. However, for very long cables, the pulse becomes elongated, and, consequently, resolution is reduced.

The pulse can be replaced with a "chirp", or swept frequency signal, which is applied to the cable 20, a "chirp", or swept frequency signal, also being reflected or an identical "chirp", or swept frequency signal, being returned, so that the reflected or returned signal can be crosscorrelated with the signature, or replica, of the "chirp", or swept frequency signal, applied to the cable. Consequently, an autocorrelation function can be derived having a sin x/x form which is a pulse-compressed form of the "chirp", or swept frequency signal, applied to the cable 20. This autocorrelation function can be precisely measured to yield high resolution in length and allows lower frequencies to be used so that there is less cable attenuation.

In the case where the transponder means 73 is used, a "chirp", or swept frequency signal, transponder at the second point 72 can improve resolution. The use of a "chirp", or swept frequency signal, transponder means 73 can also increase the range of length measurement.

While this invention has been described only for convenience and by way of example as being applied to logging cables used for lowering sondes in boreholes, or wells, in the petroleum industry, it is not limited to such a specific type of cable and method of use but can be applied equally well to other types of cables, whether steel sheathed or not. Also, while the invention has been described with a certain degree of particularity, it is manifest that many changes can be made in the details of construction and the arrangement of components without departing from the spirit and scope of this disclosure. It is understood that the invention is not limited to the exemplified embodiments set forth herein but is to be limited only by the scope of the appended claims, including the full range of equivalency to which each element thereof is entitled.

What is claimed is:

1. A method for measuring a length of electrical conductive cable, comprising the steps of:
 applying an initial electrical time pulse signal to one end of the cable whereby the initial electrical time pulse signal propagates the length of the cable;

detecting at a first point along the cable an initial passage of the initial electrical time pulse signal in the cable without electrically contacting the cable, the first point being intermediate the location where the initial electrical time pulse signal is applied and a second point along the cable;

detecting the arrival of the initial electrical time pulse signal at the second point;

returning another electrical time pulse signal in response to the detection of the arrival of the initial electrical time pulse signal at the second point;

detecting the returned electrical time pulse signal at the first point along the cable;

determining a time interval between the detection of the initial passage of the initial electrical time pulse signal and the detection of the returned electrical time pulse signal at the first point along the cable; and determining a length of cable between the first and second points from the time interval.

2. The method of claim 1 wherein the step of determining the length of cable between the first point and the second point from the time interval comprises dividing the time interval by two and multiplying times a known velocity of propagation of the electrical time pulse signal.

3. The method of claim 1 wherein the step of detecting at the first point along the cable the initial passage of the initial electrical time pulse signal in the cable without electrically contacting the cable comprises sensing a magnetic field around the cable at the first point developed by the initial passage of the initial electrical time pulse signal.

4. The method of claim 1 wherein the step of determining the time interval between the detection of the initial passage of the initial electrical time pulse signal and the detection of the returned electrical time pulse signal comprises the steps of:

starting a clock responsive to the detection of the initial passage of the initial electrical time pulse signal;

stopping the clock responsive to the detection at the first point along the cable of a subsequent passage of the returned electrical time pulse signal in the cable without electrically contacting the cable; and registering a time interval between the starting and the stopping of the clock.

5. The method of claim 4, further comprising the steps of:

dividing by two the time interval of the clock for providing a time of travel; and multiplying the travel time by a known velocity of propagation of the electrical time pulse signals in the cable.

6. The method of claim 1 wherein the step of determining a time interval between the detection of the initial passage of the initial electrical time pulse signal indicating the returned electrical time pulse signal comprises the steps of;

starting a first clock and a second clock responsive to the application of the initial electrical time pulse signal to the cable;

stopping the first clock responsive to the detection of the initial passage of the initial electrical time pulse signal at a first point;

stopping the second clock responsive to the detection of the returned electrical time pulse signal at the first point;

multiplying by two a first time interval between the starting and stopping of the first clock;

subtracting from a second time interval between the starting and stopping of the second clock the first time interval of the first clock, after multiplication by two, for providing the time of travel of the initial electrical time pulse signal from the first point to the second point; and dividing the travel time by two.

7. The method of claim 6, further comprising the step of:

determining a length of cable between the first point and the second point from the travel time, after division by two, and a known velocity of propagation of the electrical time pulse signals in the cable by multiplying the travel time, after division by two, times the known velocity of propagation.

8. A system for measuring depth from the mouth of a borehole to a well logging tool connected to one end of an electrically conductive cable suspended in the borehole comprising:

means for applying an initial electrical time pulse signal to one end of the cable, whereby the initial electrical time pulse signal propagates the length of the cable to one end of the cable to the well logging tool connected to the other end of the cable;

means for detecting at the mouth of the borehole, which is intermediate both ends of the cable, the passage of the initial electrical time pulse signal along the length of the cable;

means for detecting at the mouth of the borehole a subsequent electrical time pulse signal propagating along the length of the cable reflected from the other end of the cable;

means for determining a time interval between the detection of the initial electrical time pulse signal at the mouth of the borehole and the detection of the subsequent electrical time pulse signal at the mouth of the borehole; and means for correlating the time interval with the depth to which the well logging tool is suspended in the borehole as measured from the mouth of the borehole.

9. A method for measuring depth a well logging tool is suspended in a borehole measured from the borehole mouth to a point of attachment of the well logging tool to one end of a cable, comprising the steps of:

applying an electrical time pulse signal to a first end of the cable, whereby the electrical time pulse signal propagates the length of the cable;

detecting at a first point along the cable an initial passage of the electrical time pulse signal in the cable without electrically contacting the cable, the first point being intermediate the location where the electrical time pulse signal is applied and a second end of the cable where the electrical time pulse signal is reflected;

detecting the electrical time pulse signal at the first point along the cable without electrically contacting the cable after the electrical time pulse signal is reflected at the second end of the cable;

determining a time interval between the detection of the initial passage of the electrical time pulse signal at the first point and the detection of the reflected time pulse signal at the first point;

determining a length of cable between the first point and the second end of the cable from the time interval; and determining the depth of well logging tool is suspended in the borehole, as measured from the borehole mouth, from the length of cable.

10. The method of claim 9 wherein the step of determining the length of cable between the first point and the second end of the cable from the time interval includes employing a known velocity of propagation of the electrical time pulse signal in the cable, dividing the time interval by two and multiplying times the known velocity of propagation.

11. The method of claim 9 wherein the step of detecting at the first point along the cable the initial passage of the electrical time pulse signal in the cable without electrically contacting the cable comprises sensing a magnetic field around the cable at the first point generated by the initial passage of the electrical time pulse signal.

12. The method of claim 9 wherein the cable comprises at least one conductor surrounded by a conductive sheath and the electrical time pulse signal is applied between the at least one conductor and a conductive sheath of the cable.

13. The method of claim 9 wherein the cable comprises at least two conductors, including a first conductor and a second conductor and the electrical time pulse signal is applied between the first and second conductors of the cable.

14. The method of claim 9 wherein the step of determining the time interval between the detection of the initial passage of the electrical time pulse signal and the detection of the reflected time pulse signal comprises the steps of:
   starting a clock responsive to the detection of the initial passage of the electrical time pulse signal at the first point along the cable;
   stopping the clock responsive to the detection of the reflected electrical time pulse signal at the first point along the cable; and
   registering a time interval between the starting and stopping of the clock.

15. The method of claim 14 further comprising the steps of:
   dividing by two the time interval of the clock for providing a time of one way travel; and
   multiplying the one way travel time by a known velocity of propagation of the electrical time pulse signal in the cable.

16. The method of claim 9 wherein the step of determining the time interval between the detection of the initial passage of the electrical time pulse signal and the detection of the reflected electrical time pulse signal comprises the steps of:
   starting a first clock and a second clock responsive to the application of the electrical time pulse signal to the first end of the cable;
   stopping the first clock responsive to the detection of the initial passage of electrical time pulse signal at the first point along the length of the cable;
   stopping the second clock responsive to the detection of the reflected time pulse signal at the first point along the length of the cable;
   multiplying by two a reading of the first clock with the time interval between the starting and stopping of the first clock;
   subtracting from a reading of the second clock the reading of the first clock, after multiplying by two, for providing the two way time of travel of the electrical time pulse signal from the first point to the second end of the cable; and
   dividing the two way time of travel by two, whereby the result is the one way travel time of the electrical time pulse signal from the first point to the second end of the cable.

17. The method of claim 16 further comprising the step of:
   determining a length of cable between the first point and the second end of the cable from the one way travel time and a known velocity of propagation of the electrical time pulse signal in the cable by multiplying the one way travel time times the known velocity of propagation of the electrical time pulse signal.

18. An apparatus for measuring the depth a well logging tool is suspended in a borehole measured from the borehole mouth to a point of attachment of the well logging tool to one end of a cable, comprising:
   means for applying an initial electrical time pulse signal to a first end of the cable whereby the initial electrical time pulse signal propagates the length of the cable from the location of application of the initial electrical time pulse signal past a first point intermediate both ends of the cable to a second end of the cable;
   means for detecting at the first point an initial passage of the initial electrical time pulse signal without electrically contacting the cable;
   said means at the first point for detecting the initial electrical time pulse signal reflected from the second end of the cable, whereby the reflected initial electrical time pulse signal propagates from the second end of the cable past the first point to the first end of the cable; and
   means for determining a time interval between the detection of the initial passage of the initial electrical time pulse signal and the detection of the reflected electrical time pulse signal, the time interval being correlated to the length of cable between the first point and the second end of the cable and the depth the well logging tool is suspended in the borehole as measured from the borehole mouth.

19. The apparatus of claim 18 further comprising means responsive to the time interval and a known velocity of propagation of the electrical time pulse signal in the cable for determining the length of cable between the first point and the second end of the cable by dividing the time interval by two and multiplying times the known velocity of propagation.

20. The apparatus of claim 18 wherein the said means for determining the time interval comprises:
   means for starting a clock responsive to the detection of the initial passage of the initial electrical time pulse signal at the first point along the cable;
   means for stopping the clock responsive to the detection at the first point along the cable the passage of the reflected initial electrical time pulse signal in the cable without electrically contacting the cable; and
   means for registering a reading between the starting and stopping of the clock.

21. The apparatus of claim 20 further comprising:
   means for dividing the reading of the clock for providing a time of travel; and
   means for multiplying the travel time by a known velocity of propagation of the electrical time pulse signal in the cable.

22. The apparatus of claim 18 wherein said means for determining time interval includes:
- means for starting a first clock and a second clock responsive to the application of the initial electrical time pulse signal to the first end of the cable;
- means for stopping the first clock responsive to the detection of the initial passage of the initial electrical time pulse signal at the first point along the cable;
- means for stopping the second clock responsive to the detection of the reflected initial electrical time pulse signal at the first end of the cable;
- means for multiplying by two a reading of the first clock; and
- means for subtracting from a reading of the second clock the reading of the first clock after multiplication by two for providing the time of travel of the initial electrical time pulse signal from the first point to the second end of the cable and the subsequent reflected initial electrical time pulse signal from the second end of the cable to the first point; and
- means for dividing the travel time by two.

23. The apparatus of claim 22, further comprising:
- means for determining a length of cable between the first point and the second end of the cable from the travel time after division by two and a known velocity of propagation of the electrical time pulse signal in the cable by multiplying the travel time by two times the known velocity of propagation.

24. The apparatus of claim 18 wherein said means for detecting at the first point the initial passage of the initial electrical time pulse signal without electrically contacting the cable comprises:
- a u-shaped core of selected magnetic materials, the core placed at the first point with the cable between the arms of the u-shaped core; and
- a coil around the u-shaped core having two terminals, whereby the initial passage of the initial elecrical time pulse signal generates an electrical response at the terminals.

25. The apparatus of claim 18 wherein said means for detecting at the first point the initial passage of the initial electrical time pulse signal without electrically contacting the cable comprises:
- a toroidal core of selected magnetic material and size to surround the cable; and
- a coil around the toroidal core having two terminals, whereby the initial passage of the initial electrical time pulse signal generates an electrical response at the terminals.

* * * * *

UNITED STATES PATENT OFFICE
CERTIFICATE OF CORRECTION

PATENT NO. : 4,597,183
DATED : July 1, 1986
INVENTOR(S) : Robert A. Broding

It is certified that error appears in the above-identified patent and that said Letters Patent are hereby corrected as shown below:

Column 3, line 7, "in" should read --of--.

Column 3, line 18, "of" should read --to--.

Column 6, line 14, "anode" should read --sonde--.

Signed and Sealed this

Twenty-first Day of June, 1988

Attest:

DONALD J. QUIGG

Attesting Officer

Commissioner of Patents and Trademarks